Patented Nov. 29, 1949

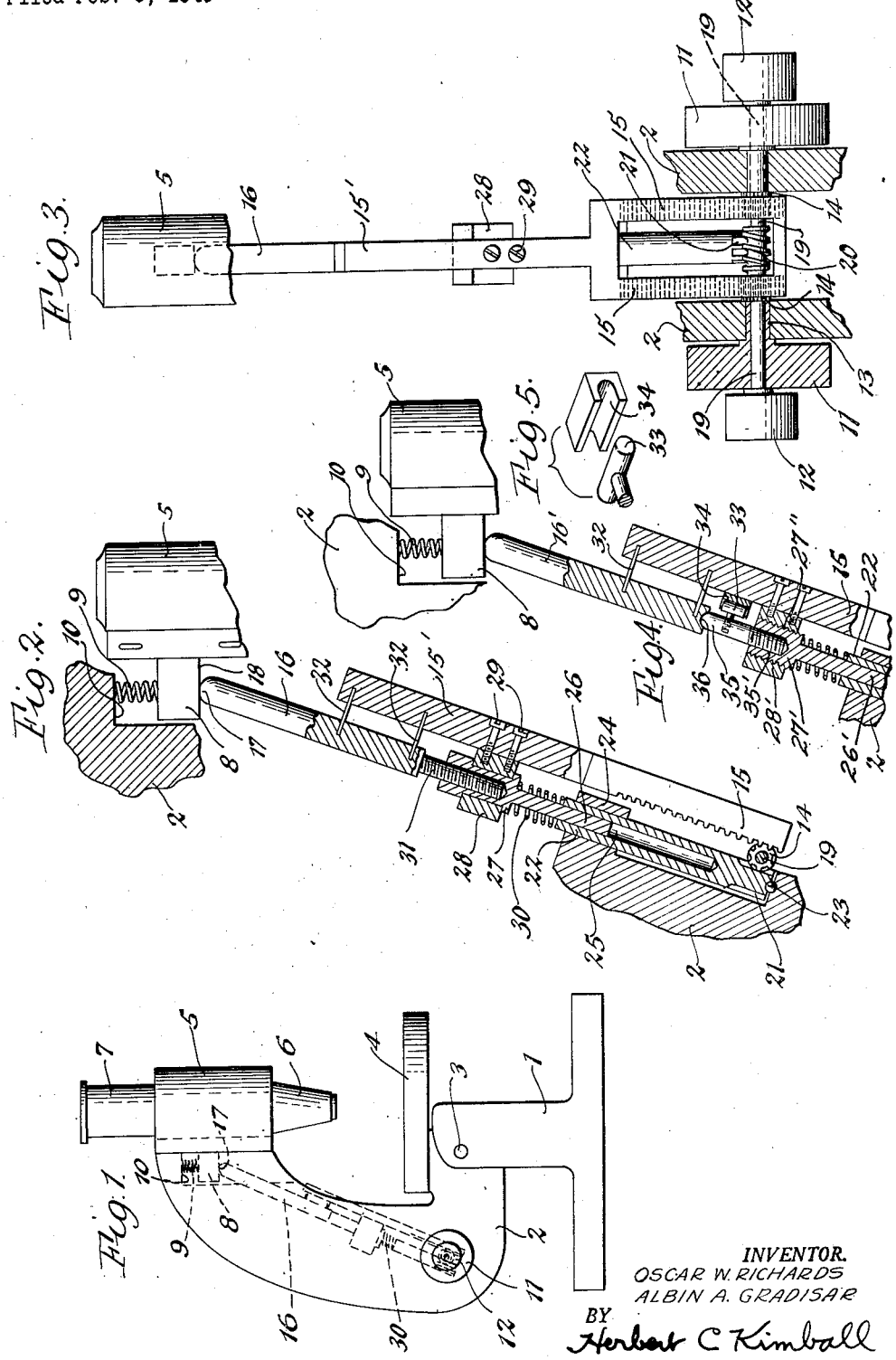

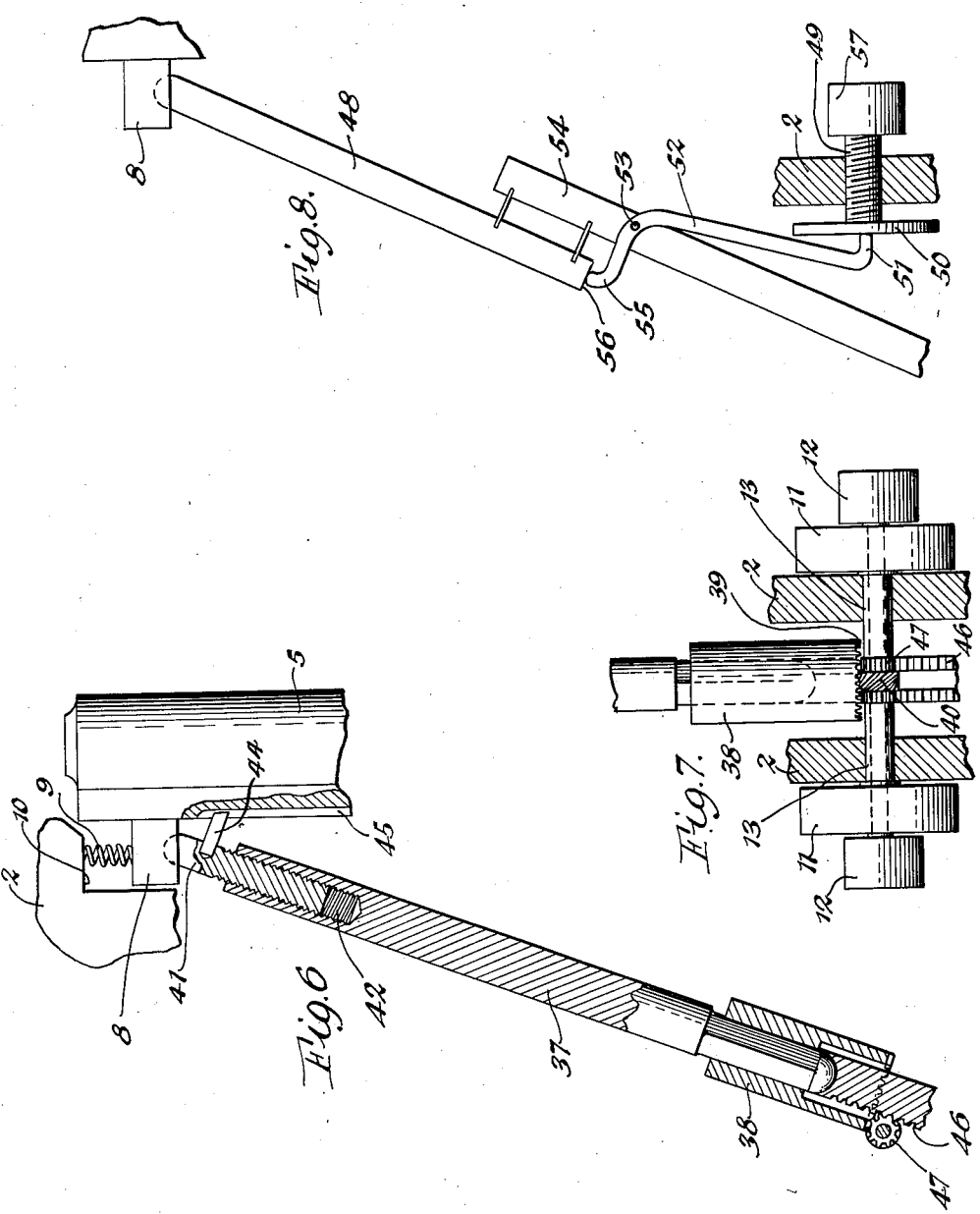

2,489,487

UNITED STATES PATENT OFFICE 2,489,487

COARSE AND FINE ADJUSTMENT MECHANISM FOR MICROSCOPES

Albin A. Gradisar, Buffalo, and Oscar W. Richards, Snyder, N. Y., assignors, by mesne assignments, to American Optical Company, Southbridge, Mass., a voluntary association Application February 5, 1945, Serial No. 576,314

3 Claims. (Cl. 88—39)

This invention relates to improvements in adjustment mechanisms for microscopes or the like and has particular reference to a new and improved coarse and fine adjustment mechanisms with a low positioned control for each.

An object of the invention is to so construct and arrange coarse and fine adjustment mechanisms for microscopes or the like that the control will be positive, accurate and precise in operation, yet relatively simple and economical in construction.

Another object of the invention is to provide a combined coarse and fine adjustment for a microscope or the like which have low positioned controls.

Other objects and advantages of the invention will be apparent from the following description taken in connection with the accompanying drawings. It will be understood that many changes may be made in the details of construction and arrangement of parts without departing from the scope of the invention as expressed in the accompanying claims. We, therefore, do not wish to be limited to the exact details of construction and arrangement of parts shown and described as the forms shown have been given by way of illustration only.

Referring to the drawings:

Fig. 1 is a side elevation of a microscope embodying the invention;

Fig. 2 is a fragmentary side view, partially in section, of the form of the invention shown in Fig. 1;

Fig. 3 is a front view of the construction shown in Fig. 2;

Fig. 4 is a view generally similar to Fig. 2 but showing a different form of the invention;

Fig. 5 is a perspective view of a pair of slidable connecting members employed as part of the actuating means of Fig. 4 for moving the body tube of a microscope;

Fig. 6 is a view similar to Fig. 2 but showing a further form of the invention;

Fig. 7 is a fragmentary front view of the form of the invention shown in Fig. 6; and Fig. 8 is a side view of a still further form of the invention.

In the manufacture of microscopes it has been found if the control knob for at least the fine adjustment mechanism and preferably the coarse and fine adjustment mechanism be placed at a low position on the instrument, for example, about eight centimeters above the bottom of the instrument, that the use and manipulation of the control knobs is considerably facilitated. This is due to the ability of the microscopist to rest or steady the edge of his or her hand on the table during the movement or rotation of the control knobs to adjust the instrument. Also, for many years, it has been found that one of the most satisfactory mechanisms employed for the fine adjustment mechanism has been the differential screw principle. This arrangement is positive acting and provides an excellent fine adjustment mechanism. However, due to the fact that this differential screw is necessarily positioned near or in engagement with the body tube of the microscope, it has not been possible with prior arrangements to employ the differential screw fine adjustment mechanism in combination with a low positioned fine adjustment knob or control except in a complicated, relatively expensive construction.

One decided advantage of the present invention is that the differential screw principle may be used in a construction which places the controls for both fine and coarse adjustments in the preferred low position.

Referring more particularly to the drawings wherein similar reference characters designate corresponding parts throughout the several views, the microscope shown in Fig. 1, embodying the invention comprises the base 1 on which is pivotally mounted the upright arm 2 on the pivot 3.

The microscope arm 2 carries the stage 4 for supporting specimens to be examined.

The body tube member 5 is adjustably connected to the forward end of the arm 2 adjacent the upper end of said arm by the conventional slide on the body tube which slides in a slide way on the arm 2. This slide retains the parts in assembled relation and as it is well known is not shown.

The body tube 5 carries the objective 6 and eyepiece 7 for viewing specimens on the stage 4.

The body tube 5 is also provided with a lug or projecting portion 8 which extends into a slot in the forward end of the arm 2 as shown in the drawings. There is provided a coil spring 9 between the lug 8 and shoulder 10 on the arm 2 to resiliently urge the lug 8 and body tube 5 in a direction away from said shoulder 10.

Near the base or lower end of the arm 2 (see Figs. 2 and 3) are provided the concentric coarse adjusting knobs 11 and fine adjusting knobs 12 for adjusting the body tube 5, the objective 6 and eyepiece 7 relative to a specimen on the stage 4 for focussing the optical system of the microscope relative to such specimen.

The form of stage shown is particularly adapted for the examination or observation of opaque specimens. If the microscope is to be used in connection with transparent specimens, then a stage having an opening therethrough which a condensing lens system and reflector or other light source in alignment with such condenser lens system, would be employed. This stage, condensing lens system and reflector or light source are not shown, as various conventional types thereof which are known in the art may be employed.

Each coarse adjusting knob 11 is connected to or formed integral with a sleeve 13 through which it is adapted to actuate one of the rack gears 14 to thereby adjust one of the rack bars 15 on the bifurcated lower end of the member 15'. The rod 16 is connected to said rack member 15' as hereinafter described, with the result that rotation of either knob 11 effects coarse adjustment of the microscope. During coarse adjustment rack bar 15, rod 16 and the connecting means therebetween (which means will be presently described) move bodily as a single extensible member or unit.

The upper end 17 of said rod 16 engages the lower surface 18 of the lug 8 so that the lug 8 may be raised against the action of the coil spring 9 to thereby raise the body tube 5. When the rod 16 is withdrawn through rotation of the knob 11 and rack gears 14 in the opposite direction, the coil spring 9, combining with the weight of the parts, causes the body tube 5 to be simultaneously lowered therewith.

Each fine adjustment knob 12 is on the shaft 19 through which it is adapted to actuate the fine adjustment worm gear 20 which gear meshes with the circular gear 21 adjacent the lower end of the rotatable gear member 22. Between the lower end of said member 22 and the adjacent surface of the arm 2 is provided the bearing 23 to reduce friction.

The rotatable gear member 22 extends through a yoke 24 on the arm 2 and has a hollow splined bore 25 in which is keyed the lower end 26 of the spline shaft 27.

The spline shaft 27 is journaled in and longitudinally restrained by the split collar 28 which is affixed to the member 15' by screws or the like 29. With the smooth bearing shown in this embodiment of the invention, a simple screw adjustment is effected (see Fig. 2); but if a finer adjustment is desired, the internal wall of collar 28 and the outer surface of shaft 27 may be threaded to form a differential screw in the manner illustrated in Fig. 4.

Between the upper end of the gear member 22 and a shoulder on the spline shaft 27 a coil spring 30 may be provided for taking up backlash.

The upper end of the spline shaft 27 is provided with a threaded bore for receiving the threaded extension 31 on the rod 16 which rod is keyed and connected to the rack member 15' by the flat spring members 32, for example, two of which are shown but which may be of any desired number.

The form of the invention shown in Fig. 4 is generally similar to that of Figs. 2 and 3 described above except that instead of the threaded extension 31 on the rod 16 there is provided a separate post member 35 having its upper end 36 rounded and fitting against the rounded lower end of the rod 16'.

The upper end of the spline shaft 27' is threaded as indicated at 27" in the split collar 28' which is held securely to the rack member 15'. The lower end of the post member 35 is threaded as indicated at 35' within the upper end of shaft 27', the differential between the two threads providing the fine adjustment of the microscope. As shown in Fig. 4, rotation of the post member 35 with the shaft 27' is prevented by a T connection shown more in detail in Fig. 5. The T member 33 projecting from the post member 35 lies in a groove in the slide block 34 which is carried by the rack member 15'.

The form of the invention shown in Figs. 6 and 7 is generally similar in principle to the forms previously described; but the actuating rod in this embodiment of the invention takes the form of a spline shaft 37 having its lower end received in a splined opening in the rotatable gear member 38. The shaft 37 is slidable relative to but is rotated by the gear member 38, which member has the circular gear 39 on its end face adapted to be actuated by the worm gear 40 in response to movement of the fine adjustment knob 12.

The screw 41 is threaded into the threaded bore 42 in the upper end portion of rod 37 and is provided with the pin member 44 which rides in the slot 45 in the body tube to prevent rotation of said screw 41.

In this embodiment of the invention the rod in the form of the spline shaft 37 is reciprocated by the racks 46 which are actuated by the coarse adjustment gear members 47 which in turn are actuated by either coarse adjusting knob 11 and sleeve 13. The relative rotation which takes place between the shaft 37 and the rack 46, as above explained, is made possible by a thrust bearing between the two.

The form of the invention shown in Fig. 8 comprises a bell crank lever arrangement comprising the rod 48 which engages the lower surface of the lug 8 as previously described and the coarse adjustment arrangement may be of the rack and gear or pinion type as previously described.

The fine adjusting screw 49 is provided with the bearing 50 adapted to engage the end 51 of the pivoted lever 52 which is pivotally mounted at 53 on the coarse adjusting rack member 54 and which pivoted lever has its end 55 engaging the lower end 56 of the rod 48 so that by rotating the handle 57 the screw 49 and bearing 50 are rotated causing the lever 52 to be pivoted to raise or lower the rod 48 and thereby adjust the lug 8 which engages a coil spring 9 as previously described to thereby adjust the body tube of the microscope.

The construction of the present application provides a simple, efficient and economical low positioned, combined coarse and fine adjustment mechanism which employs the screw principle and which is precise and accurate in operation.

From the foregoing it will be seen that we have provided simple, efficient and economical means for obtaining all of the objects and advantages of the invention.

Having described our invention, we claim:

1. In a microscope of the character described, a base, a supporting arm carried by said base, a stage carried by said supporting arm adjacent said base and having a work supporting surface thereon, body tube supporting member mounted on said supporting arm adjacent an upper portion thereof for rectilinear movement along a path normal to said supporting surface during focusing adjustment of said body tube supporting member, means for moving said body tube supporting member in a first direction along said path, means operatively positioned between said body tube supporting member and said arm and engaging a part fixedly attached to said body tube supporting member and said arm for constantly urging said body tube supporting member in the opposite direction along said path, the means for effecting movement of said body tube supporting member in said first direction comprising an elongated composite member having a first rigid part, a second rigid part and connecting means therebetween, said first and second rigid parts having opposite end portions thereof in adjacent overlapping relation, a coarse adjustment control and a fine adjustment control mounted upon said arm adjacent said stage, said first rigid part engaging a part fixedly attached to said body tube supporting member, said second rigid part having operative engagement with said coarse adjustment control for actuation thereby, said connecting means securing said adjacent end portions of said first and second rigid parts together in a manner to allow limited relative displacement therebetween in a direction substantially paralleling the elongated direction of said composite member while preventing all other relative movement therebetween, displacement means carried by said second rigid part in operative engagement with said first rigid part and normally preventing displacement thereof relative to said second rigid part in said opposite direction, and motion transmitting means operatively connected to said fine adjustment control and to said displacement means for effecting small amounts of displacement of said first rigid part relative to said second rigid parts when said fine adjustment control is actuated.

2. In a microscope of the character set forth in claim 1 and in which said connecting means comprises a pair of flexible elements arranged in parallel relationship fixedly secured at their opposite ends respectively to the adjacent portions of said rigid members.

3. In a microscope of the character set forth in claim 1 and in which said displacement means includes a rotatable element and a non-rotatable element in screw-threaded engagement with each other, said rotatable element being operatively connected to said fine adjustment control, said non-rotatable element engaging said first rigid part and having means slidably engaging said second rigid part so as to allow longitudinal displacement of said non-rotatable element while preventing any substantial rotation thereof, whereby actuation of said fine adjustment control will rotate said rotatable element and effect small amounts of displacement of said non-rotatable element for causing a longitudinal displacement of said first rigid part.

ALBIN A. GRADISAR.
OSCAR W. RICHARDS.

REFERENCES CITED

The following references are of record in the file of this patent:

UNITED STATES PATENTS

| Number | Name | Date |
| --- | --- | --- |
| 475,362 | Thomas | May 24, 1892 |
| 1,106,956 | Meyer | Aug. 11, 1914 |
| 1,850,513 | Murphy | Mar. 22, 1932 |
| 1,892,131 | Berger | Dec. 27, 1932 |
| 1,968,094 | Ott | July 31, 1934 |
| 2,148,576 | Ott | Feb. 28, 1939 |
| 2,363,080 | Ott | Nov. 21, 1944 |
| 2,421,126 | Ott | May 27, 1947 |

FOREIGN PATENTS

| Number | Country | Date |
| --- | --- | --- |
| 369,595 | Germany | Feb. 21, 1923 |
| 384,881 | Germany | Nov. 9, 1923 |